United States Patent
Peng et al.

(10) Patent No.: US 11,041,737 B2
(45) Date of Patent: Jun. 22, 2021

(54) METHOD, DEVICE AND SYSTEM FOR PROCESSING A FLIGHT TASK

(71) Applicant: SZ DJI TECHNOLOGY CO., LTD., Shenzhen (CN)

(72) Inventors: Bo Peng, Shenzhen (CN); Jiaxiang Fang, Shenzhen (CN); Weifeng Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 388 days.

(21) Appl. No.: 15/471,186

(22) Filed: Mar. 28, 2017

(65) Prior Publication Data

US 2017/0199053 A1    Jul. 13, 2017

Related U.S. Application Data

(63) Continuation of application No. PCT/CN2014/088028, filed on Sep. 30, 2014.

(51) Int. Cl.
 *G01C 23/00* (2006.01)
 *G06F 16/29* (2019.01)
 (Continued)

(52) U.S. Cl.
 CPC ......... *G01C 23/005* (2013.01); *G05D 1/0011* (2013.01); *G06F 16/2379* (2019.01);
 (Continued)

(58) Field of Classification Search
 CPC ............ B64C 39/024; B64C 2201/141; B64C 2201/146; B64C 19/00; B64C 2201/126;
 (Continued)

(56) References Cited

U.S. PATENT DOCUMENTS 5,586,067 A * 12/1996 Gross .................. A61B 5/1036
                                                   297/284.1
7,280,975 B1 * 10/2007 Donner ................. G06Q 10/02
                                                       235/382
(Continued)

FOREIGN PATENT DOCUMENTS

CN    101090441 A    12/2007
CN    101493699 A     7/2009
(Continued)

OTHER PUBLICATIONS

The World Intellectual Property Organization (WIPO) International Search Report for PCT/CN2014/088028 dated Jun. 26, 2015 5 Pages.

(Continued)

*Primary Examiner* — Alexander G Kalinowski
*Assistant Examiner* — Sanjeev Malhotra
(74) *Attorney, Agent, or Firm* — Anova Law Group, PLLC

(57) ABSTRACT

A method, a device and a system for processing a flight task are provided. The method comprises receiving a loading request for flight data, searching for corresponding flight data according to the loading request, processing located flight data in response to the loading request, and loading the located flight data to control a corresponding aerial vehicle to perform a corresponding flight task.

18 Claims, 11 Drawing Sheets

Generate a user interface of a three-dimensional flight route image of each flight task in a preset environmental map according to extracted flight parameters of the flight task — S501

Perform, when an edit operation on flight parameters of one or more waypoints on the three-dimensional flight route in the user interface is detected, data update for the three-dimensional flight route in the user interface according to edited flight parameters — S502

Display an updated user interface of the three-dimensional flight route comprising the flight task as the flight preview image — S503

(51) Int. Cl.
*G06F 16/245* (2019.01)
*G06F 16/23* (2019.01)
*G06F 17/40* (2006.01)
*G05D 1/00* (2006.01)
*G08G 5/00* (2006.01)

(52) U.S. Cl.
CPC ............ *G06F 16/245* (2019.01); *G06F 16/29* (2019.01); *G06F 17/40* (2013.01); *G08G 5/0013* (2013.01); *G08G 5/0034* (2013.01); *G08G 5/0069* (2013.01); *G08G 5/0086* (2013.01)

(58) Field of Classification Search
CPC ........ B64C 2201/127; B64C 2201/128; B64C 2201/145; G05D 1/101; G05D 1/0022; G05D 1/0011; G05D 1/0055; G05D 1/0088; G08G 5/0069; G08G 5/0056; G08G 5/045; G08G 5/0013; G08G 5/0034; G08G 5/0039; G08G 5/0082; B64D 41/00; B64D 47/00; B64D 47/08; B64G 1/002; B64G 1/52; G01C 23/00; G06Q 10/10; G06Q 30/018; G06Q 50/18; G06Q 50/26; H04L 47/25
USPC ... 701/2, 3, 528, 9, 467, 100, 110, 532, 411; 706/47; 705/5; 244/1 TD, 3; 434/43; 341/11
See application file for complete search history.

(56) References Cited

U.S. PATENT DOCUMENTS

| | | | |
|---|---|---|---|
| 7,884,737 B2* | 2/2011 | Zigdon | H04Q 9/00 340/870.02 |
| 8,269,651 B2* | 9/2012 | Zigdon | H04B 1/662 340/870.11 |
| 8,509,968 B1 | 8/2013 | Saccone | |
| 2002/0089610 A1* | 7/2002 | Ohno | H04N 21/6181 348/734 |
| 2002/0120555 A1* | 8/2002 | Lerner | G06Q 40/06 705/37 |
| 2002/0138392 A1* | 9/2002 | LeBlanc | G06Q 40/04 705/37 |
| 2002/0161514 A1* | 10/2002 | Shinagawa | G01C 21/20 701/411 |
| 2002/0188769 A1* | 12/2002 | Swidler | H04L 12/40058 710/8 |
| 2003/0031174 A1* | 2/2003 | Laor | H04L 45/62 370/389 |
| 2003/0139877 A1* | 7/2003 | Dwyer | G01C 23/00 701/467 |
| 2004/0083274 A1* | 4/2004 | Katiyar | G06F 16/9535 709/217 |
| 2004/0162670 A1* | 8/2004 | Brown | B64D 45/0031 701/110 |
| 2004/0198386 A1* | 10/2004 | Dupray | H04W 64/00 455/456.1 |
| 2004/0221043 A1* | 11/2004 | Su | H04L 12/1827 709/227 |
| 2004/0221055 A1* | 11/2004 | Liebenow | H04N 7/17318 709/231 |
| 2004/0249523 A1* | 12/2004 | Du | B64D 45/0031 701/9 |
| 2005/0038876 A1* | 2/2005 | Chaudhuri | H04L 67/24 709/219 |
| 2005/0135242 A1* | 6/2005 | Larsen | H04W 88/04 370/229 |
| 2007/0050240 A1* | 3/2007 | Belani | G08G 1/14 705/13 |
| 2007/0127650 A1* | 6/2007 | Altberg | G06Q 30/0242 379/114.13 |
| 2007/0280262 A1* | 12/2007 | Larsen | H04L 1/1657 370/395.21 |
| 2008/0294335 A1* | 11/2008 | Bitar | G08G 5/0039 701/467 |
| 2009/0138192 A1* | 5/2009 | Tsuyuki | G08G 5/0078 701/532 |
| 2009/0291418 A1* | 11/2009 | Srivastav | G01C 21/00 434/43 |
| 2009/0313199 A1* | 12/2009 | Hagelin | G05D 1/0088 706/47 |
| 2009/0326781 A1* | 12/2009 | Mukavetz | F02C 9/28 701/100 |
| 2011/0002393 A1* | 1/2011 | Suzuki | G10L 19/008 375/240.18 |
| 2011/0055338 A1* | 3/2011 | Loeb | B60R 22/34 709/206 |
| 2011/0139928 A1* | 6/2011 | Morris | G05D 1/102 244/1 TD |
| 2011/0295501 A1 | 12/2011 | Gutierez-Castaneda | |
| 2011/0316722 A1* | 12/2011 | Fazilleau | G01D 5/2451 341/11 |
| 2012/0078640 A1* | 3/2012 | Shirakawa | G10L 19/0212 704/500 |
| 2013/0054253 A1* | 2/2013 | Shirakawa | G10L 19/008 704/500 |
| 2013/0151291 A1* | 6/2013 | Salway | G06Q 10/02 705/5 |
| 2013/0262167 A1* | 10/2013 | Masood | G06Q 10/1091 705/7.13 |
| 2014/0061363 A1* | 3/2014 | Morris | B64C 27/02 244/3 |
| 2014/0067164 A1* | 3/2014 | Papadopoulos | B64G 1/52 701/3 |
| 2014/0142787 A1* | 5/2014 | Tillotson | H04K 3/224 701/3 |
| 2014/0330457 A1* | 11/2014 | Papadopoulos | B64G 1/52 701/3 |
| 2014/0379173 A1* | 12/2014 | Knapp | G05D 1/0055 701/2 |
| 2015/0142211 A1* | 5/2015 | Shehata | H04W 4/42 701/2 |
| 2015/0371543 A1* | 12/2015 | Amodio Leon | G08G 5/0034 701/528 |
| 2016/0114888 A1* | 4/2016 | Downey | G01C 23/00 701/2 |
| 2016/0202699 A1* | 7/2016 | Knapp | G06Q 50/18 701/3 |
| 2016/0232795 A1* | 8/2016 | Thiele | G05D 1/0022 |
| 2016/0240091 A1* | 8/2016 | Thiele | G08G 5/0065 |
| 2016/0285774 A1* | 9/2016 | Downey | B64C 39/024 |
| 2017/0186329 A1* | 6/2017 | Gao | G05D 1/106 |
| 2017/0297707 A1* | 10/2017 | Rollefstad | G05D 1/0005 |

FOREIGN PATENT DOCUMENTS

| | | |
|---|---|---|
| CN | 101739845 A | 6/2010 |
| CN | 102483865 A | 5/2012 |
| CN | 102722624 A | 10/2012 |
| CN | 202694151 U | 1/2013 |
| CN | 103295089 A | 9/2013 |
| CN | 103426282 A | 12/2013 |
| CN | 203350718 U | 12/2013 |
| CN | 103513922 A | 1/2014 |
| CN | 203414782 U | 1/2014 |
| EP | 2650738 A1 | 10/2013 |
| JP | 2003130676 A | 5/2003 |
| JP | 2003130677 A | 5/2003 |
| JP | 2007093045 A | 4/2007 |
| JP | 2008105591 A | 5/2008 |
| JP | 2008203097 A | 9/2008 |
| JP | 2010128288 A | 6/2010 |
| JP | 2011010133 A | 1/2011 |
| JP | 2012035824 A | 2/2012 |
| JP | 2012122913 A | 6/2012 |
| JP | 2013177120 A | 9/2013 |

(56) References Cited

FOREIGN PATENT DOCUMENTS

OTHER PUBLICATIONS

The Japan Patent Office (JPO) Decision to Decline the Amendment and Translation for 2016-537019 dated Aug. 8, 2017 4 Pages.

\* cited by examiner

METHOD, DEVICE AND SYSTEM FOR PROCESSING A FLIGHT TASK

CROSS-REFERENCE TO RELATED APPLICATION

This is a continuation application of International Application No. PCT/CN2014/088028, filed on Sep. 30, 2014, the entire contents of which are incorporated herein by reference.

TECHNICAL FIELD

The present disclosure relates to the field of flight technology, and in particular to a method, a device and a system for processing a flight task.

BACKGROUND

With the development of science and technology and the improvement of people's living standard, a flight has become an event that may often be involved in people's daily life, for example a flight event about a model plane and the like. A person may have an aerial vehicle such as an unmanned aerial vehicle (UAV) for performing a flight task such as an aerial photography, a patrolling or the like for his/her interests and hobbies about a flight.

When a user controls a flight of an aerial vehicle using a dedicated flight remote controller or a mobile intelligent terminal, the user usually can remotely control the flight of the aerial vehicle as needed, to implement different flight actions and shoot images of favorable environments.

In the conventional technologies, when the user accomplishes a certain flight task, and needs to perform a certain flight action that is the same as the certain flight task once again or shoot an image at a certain same position, the user needs to implement a corresponding action according to his/her memory, or determine a corresponding shooting position and shooting direction based on a shot image, which is time and effort consuming.

SUMMARY

The present disclosure provides a method, a device and a system for processing a flight task, which may quickly achieve a reproduction of part or all contents of flight tasks by loading recorded flight data.

In one aspect, the present disclosure provides a flight task processing method comprising receiving a flight data loading request, searching for corresponding flight data according to the loading request, processing located flight data in response to the loading request, and loading the located flight data to control a corresponding aerial vehicle to perform a corresponding flight task.

In some embodiments, searching for the corresponding flight data comprises searching for the corresponding flight data in a preset flight database according to the loading request. The flight database records flight data corresponding to a performed flight task.

In some embodiments, the method further comprises, before receiving the loading request, obtaining the flight data corresponding to the performed flight task and updating the preset flight database according to the flight data corresponding to the performed flight task.

In some embodiments, obtaining the flight data corresponding to the performed flight task comprises obtaining flight parameters generated by an aerial vehicle during the performed flight task and generating description information of the performed flight task according to the obtained flight parameters. The obtained flight parameters and the generated description information are used as the flight data corresponding to the performed flight task.

In some embodiments, obtaining the flight parameters comprises performing at least one of obtaining flight parameters of a managed aerial vehicle during the performed flight task or downloading flight parameters corresponding to the performed flight task from a server. The flight parameters are generated by the aerial vehicle during the performed flight task and uploaded onto the server.

In some embodiments, obtaining the flight parameters comprises obtaining at least one of a waypoint coordinate, an altitude of a waypoint or a flight speed of the aerial vehicle during the performed flight task, or an image acquiring direction or an image acquiring speed of air image acquiring device mounted on the aerial vehicle.

In some embodiments, the flight parameters comprise the waypoint coordinate and generating the description information comprises generating description information of a flight region determined according to the waypoint coordinate.

In some embodiments, searching for the corresponding flight data in the preset flight database comprises extracting flight data of at least one flight task from the preset flight database according to the loading request, generating a user prompt according to the extracted flight data, displaying the user prompt, receiving a select operation performed on the user prompt, and searching for the corresponding flight data according to the select operation.

In some embodiments, generating the user prompt comprises generating a flight preview image corresponding to each of the at least one flight task according to the extracted flight data of the at least one flight task and a preset environmental map, and displaying the user prompt comprises displaying the flight preview image as the user prompt.

In some embodiments, generating the flight preview image comprises generating a three-dimensional flight route image of each of the at least one flight task in the preset environmental map according to the extracted flight parameters of the at least one flight task, and configuring description information of a waypoint at the waypoint in the three-dimensional flight route image. The description information comprises at least one of position information of the waypoint or reference information of an image shot at the waypoint. Displaying the flight preview image comprises displaying the three-dimensional flight route image having the description information as the flight preview image.

In some embodiments, generating the flight preview image comprises generating a user interface of a three-dimensional flight route of each of the at least one flight task in the preset environmental map according to the extracted flight parameters of the at least one flight task, and performing, when an edit operation on flight parameters of a waypoint on the three-dimensional flight route in the user interface is detected, data update for the three-dimensional flight route in the user interface according to edited flight parameters. Displaying the flight preview image comprises displaying an updated user interface of the three-dimensional flight route as the flight preview image.

In some embodiments, the method further comprises storing at least one flight template object including flight instruction data, searching, when a template loading request is received, for a flight template object according to the template loading request, processing a located flight template object, and loading the located flight template object to control a flight of an aerial vehicle.

In some embodiments, the method further comprises searching, when a sharing request is received, for flight data corresponding to a flight task indicated by the sharing request, and sharing the flight data corresponding to the flight task indicated by the sharing request.

In another aspect, the present disclosure provides a flight task processing device comprising a processor, an input device coupled to the processor and configured to receive a flight data loading request, and a memory coupled to the processor and storing instructions that, when executed by the processor, cause the processor to search for corresponding flight data according to the loading request, process located flight data in response to the loading request, and load the located flight data to control a corresponding aerial vehicle to perform a corresponding flight task.

In some embodiments, the instructions further cause the processor to search for the corresponding flight data in a preset flight database according to the loading request, the flight database recording flight data corresponding to a performed flight task.

In some embodiments, the instructions further cause the processor to obtain the flight data corresponding to the performed flight task and update the preset flight database according to the flight data corresponding to the performed flight task.

In some embodiments, the instructions further cause the processor to obtain flight parameters generated by an aerial vehicle during the performed flight task, generate description information of the performed flight task according to the obtained flight parameters, and use the obtained flight parameters and the generated description information as the flight data corresponding to the performed flight task.

In some embodiments, the instructions further cause the processor to perform at least one of: obtaining flight parameters of a managed aerial vehicle during the performed flight task, or downloading flight parameters corresponding to the performed flight task from a server. The flight parameters are generated by the aerial vehicle during the performed flight task and uploaded onto the server.

In some embodiments, the instructions further cause the processor to extract flight data of at least one flight task from the preset flight database according to the loading request, generate a user prompt according to extracted flight data, display the user prompt, receive a select operation performed on the user prompt, and search for the corresponding flight data according to the select operation.

In some embodiments, the instructions further cause the processor to extract the flight data of the at least one flight task from the preset flight database according to the loading request, generate a flight preview image corresponding to each of the at least one flight task according to the extracted flight data of the at least one flight task and a preset environmental map, and display the flight preview image as the user prompt.

In some embodiments, the instructions further cause the processor to generate a three-dimensional flight route image of each of the at least one flight task in the preset environmental map according to the extracted flight parameters of the at least one flight task, configure description information of a waypoint at the waypoint in the three-dimensional flight route image, the description information comprising at least one of position information of the waypoint or reference information of an image shot at the waypoint, and display the three-dimensional flight route image having the description information as the flight preview image.

In some embodiments, the instructions further cause the processor to generate a user interface of a three-dimensional flight route of each of the at least one flight task in the preset environmental map according to the extracted flight parameters of the at least one flight task, perform, when receiving an edit operation on flight parameters of a waypoint on the three-dimensional flight route in the user interface, data update for the three-dimensional flight route in the user interface according to edited flight parameters, and display an updated user interface of the three-dimensional flight route as the flight preview image.

In some embodiments, the memory further stores at least one flight template object including flight instruction, and the instructions further cause the processor to, when receiving a template loading request, search for a flight template object according to the template loading request, process a located flight template object, and load the located flight template object to control a flight of an aerial vehicle.

In some embodiments, the instructions further cause the processor to, when receiving a sharing request, search for flight data corresponding to a flight task indicated by the sharing request and control an output device to share the flight data corresponding to the flight task indicated by the sharing request.

In another aspect, the present disclosure provides a flight processing system comprising a user terminal and a server. The user terminal is configured to initiate a flight data loading request. The server is configured to, after receiving the loading request, search for corresponding flight data in a preset flight database according to the loading request, process, in response to the loading request, located flight data, and send processed flight data to the user terminal. The flight database records flight data corresponding to a performed flight task. The user terminal is further configured to generate a flight instruction according to the processed flight data to control a flight of an aerial vehicle managed by the user terminal.

In some embodiments, the user terminal is further configured to, when receiving a sharing request for recorded flight data, send the recorded flight data to the server to share the flight data.

In accordance with the present disclosure, flight data of various performed and stored flight tasks can be loaded at any time according to the needs of a user. As such, time and effort may be saved. It is convenient and meets the user's requirement to automate and intelligentize the process of reproducing a flight task.

DETAILED DESCRIPTION OF THE EMBODIMENTS

The technical solutions of the present disclosure will be described in detail below in combination with the drawings in the embodiments of the present disclosure. It should be appreciated that embodiments described herein are only some rather than all of the embodiments of the present disclosure. All other embodiments obtained by those having ordinary skill in the art on the basis of the embodiments of the present disclosure without any inventive efforts should fall within the scope of the present disclosure.

Figure 1:
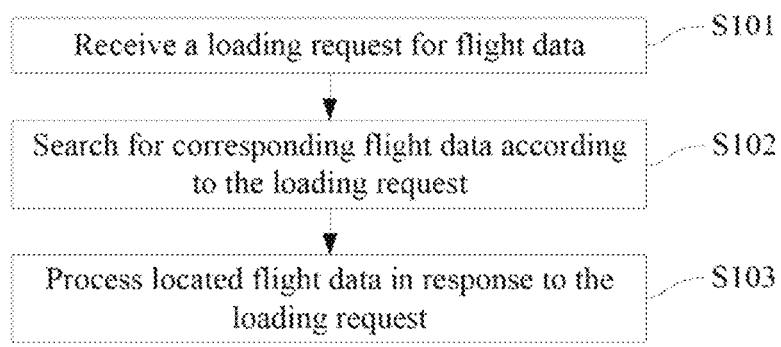
FIG. 1 is a flow chart of a method for processing a flight task in accordance with an embodiment of the present disclosure.

FIG. 1 shows a flow chart of a method for processing a flight task in accordance with an embodiment of the present disclosure, which may be implemented in a remote controller or an intelligent terminal such as a smart phone, a tablet, an intelligent wearable device or the like. Details of the method shown in FIG. 1 are described below.

S101: receiving a loading request for flight data.

The loading request for flight data may be generated by a user performing a loading operation on an application program APP configured to control an aerial vehicle. In some embodiments, the loading request may be a request message received by a terminal configured to perform the method, i.e., the local terminal, sent by another terminal in a wired or wireless manner, for requesting to load the flight data stored in the local terminal.

S102: searching for corresponding flight data according to the loading request.

The corresponding flight data may be searched for in a preset flight database according to the loading request. The preset flight database may record flight data corresponding to at least one flight task. The preset flight database may be a database built in the local terminal, or an external database disposed in a certain specified server. If the flight database is built in the local terminal, the corresponding flight data may be searched for directly in the flight database. If the flight database is disposed in an external specified server, a search request may be initiated over a network to search for the corresponding flight data in the flight database of the server.

Various flight data in the flight database may be distinguished by flight tasks. The flight database may manage various flight data according to flight tasks.

In some embodiments, the flight data may comprise various flight-related data generated by one or more aerial vehicles managed by the local terminal when performing certain flight tasks. For example, various flight-related data of an aerial vehicle when performing a flight task may specifically comprise flight parameters such as a waypoint coordinate, an altitude of a waypoint, a flight speed, an orientation of a gimbal, a picture acquiring speed, and the like, and description information such as a flight region, an acquired picture, time, weather condition, and the like when the flight task is performed.

In some embodiments, the flight data comprising the flight parameters and the description information may be recorded into the flight database through Internet or manually by a user, or the like.

S103: in response to the loading request, processing located flight data, to complete a loading of the located flight data so as to control a corresponding aerial vehicle to perform a corresponding flight task.

The processing of flight data may comprise interpreting and recognizing, transmitting, or loading processing. In response to a loading operation performed by the user of the local terminal, the interpreting, recognizing and loading processing may be performed directly, to convert the located original flight data into a control instruction that may control a flight of the aerial vehicle or an image acquiring manner of an image acquiring apparatus mounted on the aerial vehicle;

In the scenario involving a loading request initiated by another terminal, the located flight data may be encapsulated according to a protocol and transmitted to the terminal that initiated the loading request, also referred to as a "requesting terminal." The terminal that initiated the loading request may perform the interpreting, recognizing and the loading operation, and finally convert the located flight data into a control instruction that may control a flight of an aerial vehicle or an image acquiring manner of an image acquiring apparatus mounted on the aerial vehicle.

According to methods consistent with the present disclosure, flight data of various performed and stored flight tasks can be loaded at any time according to the needs of a user. As such, time and effort may be saved. The method is convenient and meets the user's requirement to automate and intelligentize the process of reproducing a flight task.

Figure 2:
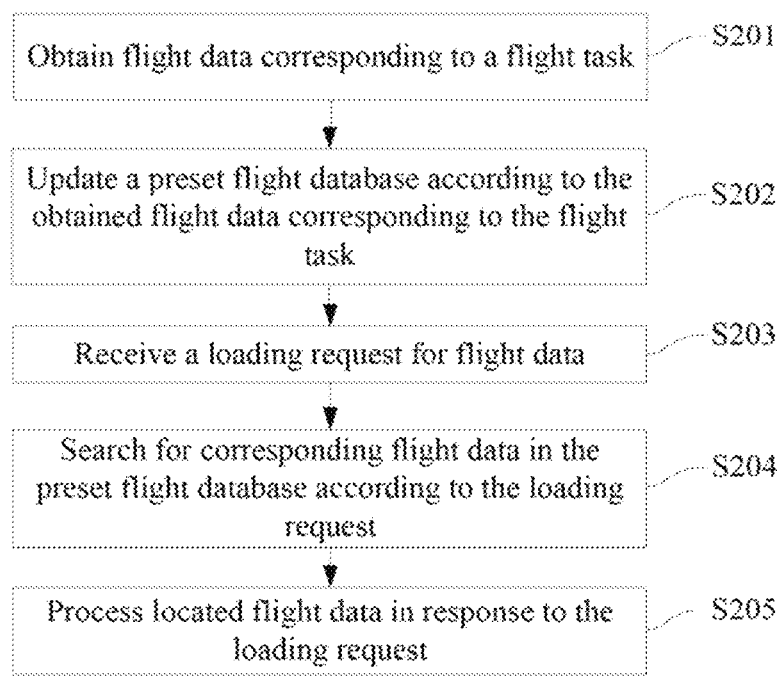
FIG. 2 is a flow chart of another method for processing a flight task in accordance with an embodiment of the present disclosure.

Another method for processing a flight task in accordance with an embodiment of the present disclosure will be described in detail below in connection with FIG. 2 to FIG. 5. FIG. 2 is a flow chart of another method for processing a flight task in accordance with an embodiment of the present disclosure, which may be implemented in a remote controller or an intelligent terminal such as a smart phone, a tablet, an intelligent wearable device, or the like. The method shown in FIG. 2 will be described in more detail below.

S201: obtaining flight data corresponding to a flight task.

In some embodiments, the flight data may comprise various flight parameters of an aerial vehicle in the course of flight and description information associated with the flight task. Obtaining the flight data may specifically comprise obtaining flight parameters generated by the aerial vehicle in the course of the flight task and generating the description information of the flight task according to the obtained flight parameters. The obtained flight parameters and the generated description information are used as the flight data corresponding to the flight task.

Further, obtaining the flight parameters generated by the aerial vehicle in the course of the flight task may specifically comprise obtaining flight parameters of at least one managed aerial vehicle in the course of the at least one aerial vehicle performing the flight task and/or downloading from a server flight parameters generated by an aerial vehicle when performing the flight task and uploaded onto the server.

In some embodiments, the flight parameters may specifically comprise any one or a combination of more than one of: a waypoint coordinate, an altitude of a waypoint, and a flight speed of a corresponding aerial vehicle in the course of flight, and an image acquiring direction and an image acquiring speed of an image acquiring device mounted on the aerial vehicle.

The generated description information may be generated automatically according to specific contents of the flight parameters. In some embodiments, the description information may comprise description information of a flight region determined according to a waypoint coordinate in the flight parameters, i.e. position description information. In some embodiments, weather information can be obtained by searching the Internet according to the waypoint and a time value, such that the description information may also comprise weather description and the time value. In some embodiments, images acquired by a video camera carried on a gimbal may also be included in the description information.

S202: updating a preset flight database according to the obtained flight data corresponding to the flight task.

The flight database may be preset, or may be generated when the flight data of a flight task is received. The flight database may be updated in real time according to the obtained or searched flight data of the flight task.

The process described above in S201 to S202 may be a presetting process of the flight database, such that the flight database can be used later as desired.

S203: receiving a loading request for flight data.

The loading request may be generated by a user performing a click operation, or may be a request message sent from another terminal to the local terminal in a wired or wireless manner to share a flight task of the local terminal.

S204: searching for corresponding flight data in the preset flight database, i.e. the above-described preset flight database recording flight data corresponding to at least one flight task, according to the loading request.

Figure 3:
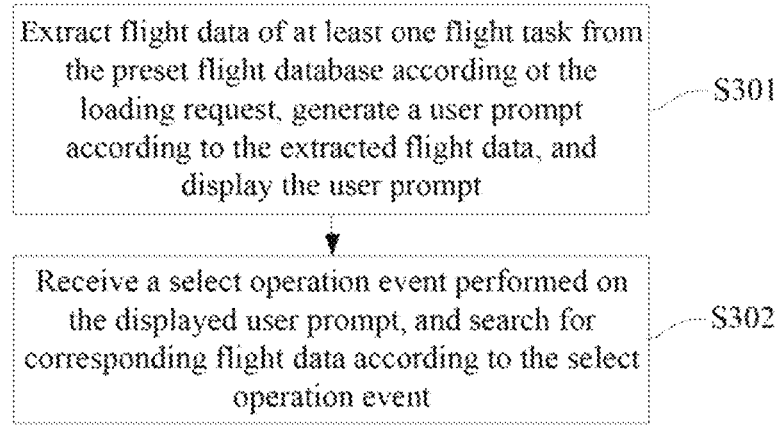
FIG. 3 is a flow chart of a method for seeking and determining flight data in accordance with an embodiment of the present disclosure.
Figure 4:
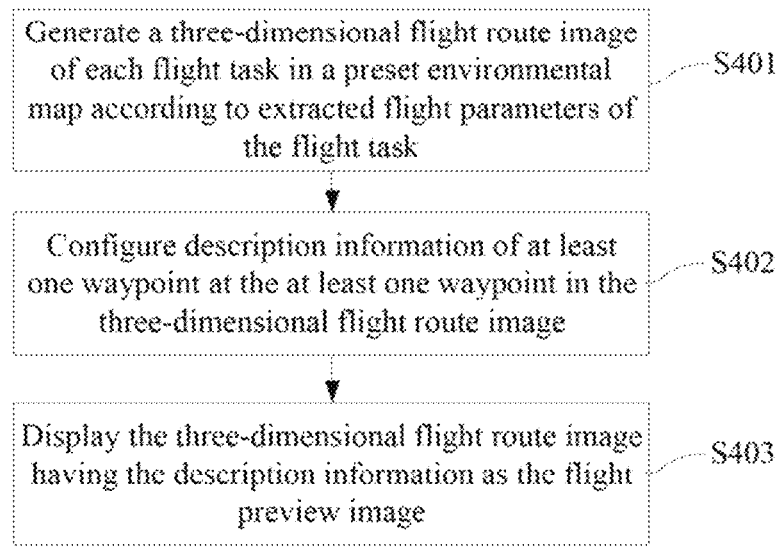
FIG. 4 is a flow chart of a method for generating a preview image in accordance with an embodiment of the present disclosure.
Figure 5:
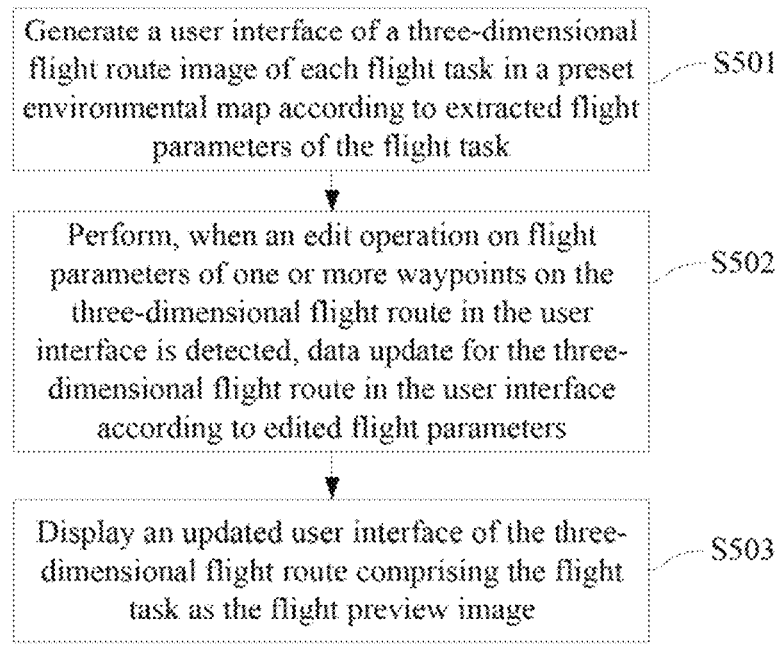
FIG. 5 is a flow chart of another method for generating a preview image in accordance with an embodiment of the present disclosure.

The process at S204 will be described in more detail with reference to FIG. 3 to FIG. 5.

S205: in response to the loading request, processing located flight data, to complete a loading operation for the located flight data so as to control a corresponding aerial vehicle to perform a corresponding flight task.

In some embodiments, the processing may comprise obtaining a corresponding flight control instruction according to the located flight data, to enable an aerial vehicle currently managed by the local terminal to reproduce the flight task corresponding to the located flight data based on the flight control instruction. In some embodiments, the processing may comprise performing transmitting processing for the flight data, such as encoding and encapsulating that may be needed according to possible transmission, then sending the corresponding data to a terminal that initiated the loading request, such that the terminal may obtain the corresponding flight control instruction to control an unmanned aerial vehicle managed by the terminal to reproduce the flight task.

Further, a method of searching for and determining flight data (process S204 in FIG. 2) in accordance with an embodiment of the present disclosure will be described in more detail below in connection with the flow chart shown in FIG. 3.

S301: extracting flight data of at least one flight task from the preset flight database according to the loading request, generating a user prompt according to the extracted flight data, and displaying the user prompt.

After receiving the loading request, the terminal may display to the user the flight data of all flight tasks in a built-in flight database of the terminal. The user may select one of or a combination of more than one of the flight tasks. In some embodiments, a preview image having a route and a corresponding position map may be displayed as a user prompt for the user to make a selection. In the scenario that the loading request is initiated by another terminal, the local terminal may send the generated user prompt to the terminal that initiated the loading request to be displayed in the requesting terminal.

S302: receiving a select operation event performed on the displayed user prompt, and search for corresponding flight data according to the select operation event.

In S302, the corresponding flight data may be searched for according to the user's select operation.

In some embodiments, the process in S301 may comprise extracting the flight data of the at least one flight task from the preset flight database according to the loading request, generating a flight preview image corresponding to each flight task according to the extracted flight data of each flight task and a preset environmental map, and displaying the flight preview image as the user prompt to the user.

Further, a method for generating the flight preview image corresponding to each flight task according to an exemplary embodiment of present disclosure will be described below with reference to the flow chart shown in FIG. 4.

S401: generating a three-dimensional flight route image of each flight task in the preset environmental map according to extracted flight parameters of the flight task.

S402: configuring description information of at least one waypoint at the at least one waypoint in the three-dimensional flight route image.

S403: displaying the three-dimensional flight route image having the description information as the flight preview image.

In some embodiments, the description information exhibited at the at least one waypoint may comprise position information of the at least one waypoint and/or reference information of an image shot at the position point, and may further comprise information such as time, weather and the image shot at the waypoint and the like.

Through the above-described process in S401 to S403, the information corresponding to the flight task may be presented intuitively, to facilitate the user to quickly select desired flight data to reproduce a corresponding flight task.

Further, a method for generating the flight preview image corresponding to each flight task according to another exemplary embodiment will be described with reference to the flow chart shown in FIG. 5.

S501: generating a user interface of a three-dimensional flight route of the flight task in a preset environmental map according to extracted flight parameters of the flight task;

S502: when an edit operation on flight parameters of one or more waypoints on the three-dimensional flight route in the user interface is detected, performing data update for the three-dimensional flight route in the user interface according to edited flight parameters. Parameters such as positions, altitudes and the like of the waypoints may be modified and edited.

S503: displaying an updated user interface of the three-dimensional flight route comprising the flight task as the flight preview image.

Through the above-described process in S501 to S503, the user may intuitively comprehend the flight task, and may be capable of adjusting relevant data of the flight task according to the user's own needs and factors that might impact the flight such as weather and so on, so as to better complete the flight task.

In some embodiments, the method in accordance with the present disclosure may further comprise storing at least one flight template object including flight instruction data for instructing a flight of an aerial vehicle. When a template loading request is received, a flight template object is searched for according to the template loading request, and a located flight template object is loaded to control the flight of the aerial vehicle.

Each of the at least one flight template object may comprise various flight parameters, such as a waypoint coordinate, altitude, orientation and the like. An ordinary user may also be able to implement some special flight actions by using these flight template objects.

In some embodiments, the method in accordance with the present disclosure may also comprise receiving a sharing request, and searching for and sharing flight data corresponding to a flight task indicated by the sharing request. A user of a terminal may share flight data corresponding to one or more flight tasks in various social networks as needed, to facilitate other users to use.

It should be noted that, methods in corresponding embodiments of FIG. 1 to FIG. 5 may be implemented by a server for managing flight tasks, which may communicate with various terminals configured to control a flight of an aerial vehicle to implement the method for processing a flight task. The specific implementation manner of the server may be similar to an operating manner of a terminal. Those skilled in the art may understand the process of implementing the method for processing a flight task in the server based on the above description of implementation in the terminal.

According to methods consistent with the present disclosure, flight data of various performed and stored flight tasks can be loaded at any time according to the needs of a user. As such, time and effort may be saved. The method is convenient and meets the user's requirement to automate and intelligentize the process of reproducing a flight task.

A device and a system for processing a flight task in accordance with an embodiment of the present disclosure will be described in detail below.

Figure 6:
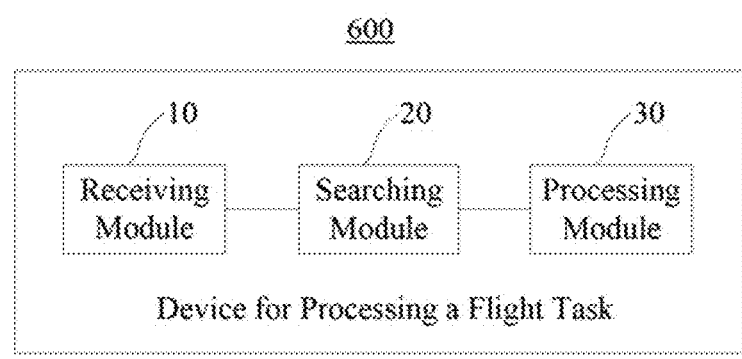
FIG. 6 is a schematic view of a device for processing a flight task in accordance with an embodiment of the present disclosure.

FIG. 6 is a schematic view of a device 600 for processing a flight task in accordance with an embodiment of the present disclosure. The device 600 may be arranged in an intelligent terminal. As shown in FIG. 6, the device 600 may comprise a receiving module 10 configured to receive a loading request for flight data, a searching module 20 configured to search for corresponding flight data according to the loading request, and a processing module 30 configured to process located flight data in response to the loading request to complete a loading operation for the located flight data so as to control a corresponding aerial vehicle to perform a corresponding flight task.

The loading request received by the receiving module 10 may be generated by a user performing a loading operation on an application program APP configured to control an aerial vehicle. In some embodiments, the loading request may be a request message received by the intelligent terminal containing the device 600, i.e., the local terminal, sent by another terminal in a wired or wireless manner, for requesting to load flight data stored in the local terminal.

The searching module 20 may search for the corresponding flight data in a preset flight database according to the loading request. The preset flight database may record flight data corresponding to at least one flight task. The preset flight database may be a database built in the local terminal, or an external database disposed in a certain specified server. If the flight database is a built-in database, the searching module 20 may search directly in the flight database. If the flight database is disposed in the external specified server, the searching module 20 may send a search request over a network to search for the flight data in the flight database of the server.

Various flight data in the flight database may be distinguished by flight tasks. The flight database may manage various flight data according to flight tasks. The searching module 20 may specifically search for flight data of a flight task that the user needs in the flight database according to, for example, the loading request, a user selection, and so on.

In some embodiments, the flight data may comprise various flight-related data generated by one or more aerial vehicles managed by the local terminal when performing certain flight tasks. For example, various flight-related data of an aerial vehicle when performing a flight task may specifically comprise flight parameters such as a waypoint coordinate, an altitude of a waypoint, a flight speed, an orientation of a gimbal, a picture acquiring speed, and the like, and description information such as a flight region, an acquired picture, time, weather condition, and the like when the flight task is performed.

In some embodiments, the flight data comprising the flight parameters and the description information may be recorded into the flight database through the Internet, or manually by a user, or the like.

The processing of the flight data by the processing module 30 may comprise interpreting, recognizing, transmitting or loading processing. In response to a loading operation by the user of the local terminal, the interpreting, recognizing and loading pray be performed directly, to convert the located original flight data into a control instruction that may control a flight of the aerial vehicle or an image acquiring manner of an image acquiring apparatus mounted on the aerial vehicle;

In the scenario involving a loading request initiated by another terminal, the processing module 30 may encapsulate the located flight data according to a protocol and transmit to the terminal that initiated the loading request. The terminal that initiated the loading request may perform the interpreting, recognizing and loading operation, and finally convert the located flight data into a control instruction that may control a flight of an aerial vehicle and an image acquiring manner of an image acquiring apparatus mounted on the aerial vehicle.

A device consistent with the present disclosure can load flight data of various performed and stored flight tasks at any time according to the needs of a user. As such, time and effort may be saved. The device is convenient to use and meets the user's requirement to automate and intelligentize the process of reproducing a flight task.

Figure 7:
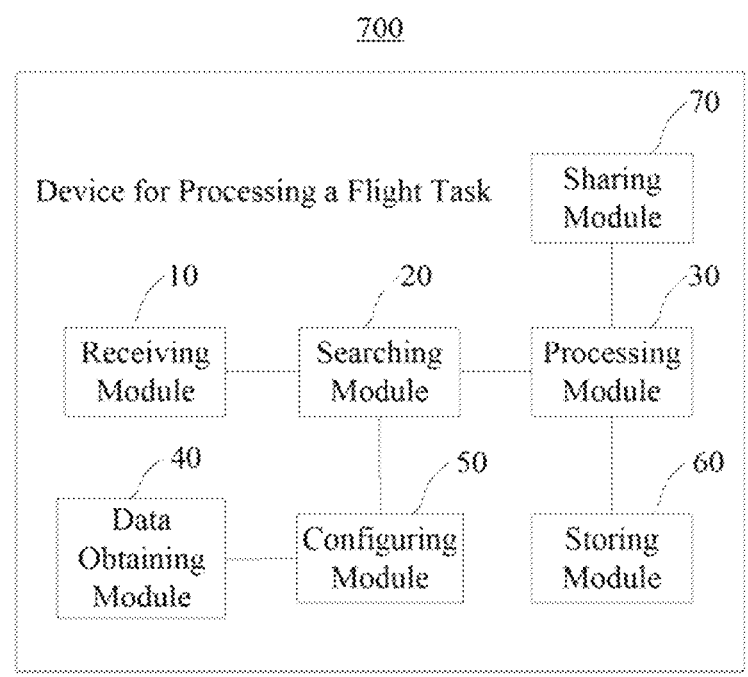
FIG. 7 is a schematic view of another device for processing a flight task in accordance with an embodiment of the present disclosure.

FIG. 7 is a schematic view of a device 700 for processing a flight task in accordance with another embodiment of the present disclosure. The device 700 may comprise the receiving module 10, the search module 20, and the processing module 30. As shown in FIG. 7, the device 700 may also comprise a data obtaining module 40 configured to obtain flight data corresponding to a flight task and a configuring module 50 configured to update a preset flight database according to the obtained flight data corresponding to the flight task.

Figure 8:
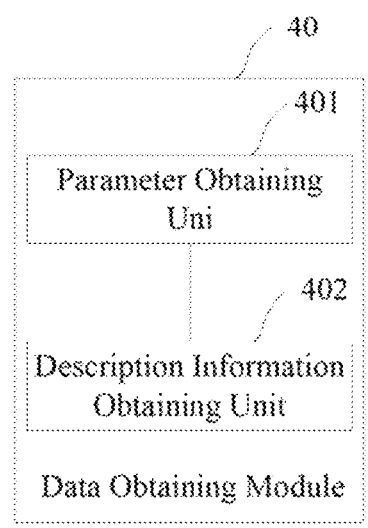
FIG. 8 is a schematic view of a data obtaining module in FIG. 7.

In some embodiments, as shown in FIG. 8, the data obtaining module 40 may specifically comprise a parameter obtaining unit 401 configured to obtain flight parameters generated by an aerial vehicle in the course of the flight task, and a description information obtaining unit 402 configured to generate description information of the flight task according to the obtained flight parameters. The obtained flight parameters and the generated description information are used as the flight data corresponding to the flight task.

In some embodiments, the parameter obtaining unit 401 may be specifically configured to obtain flight parameters of at least one managed aerial vehicle in the course of the at least one aerial vehicle performing a flight task and/or download from a server flight parameters generated by an aerial vehicle in the course of performing the flight task and uploaded onto the server.

Figure 9:
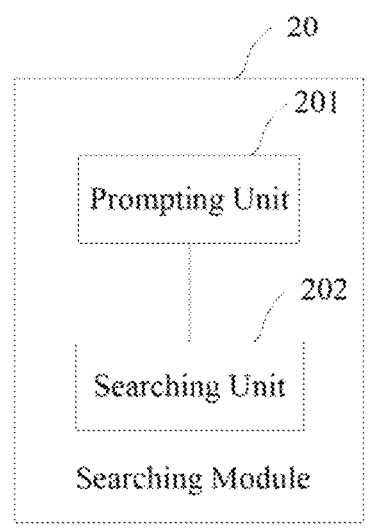
FIG. 9 is a schematic view of a seeking module in FIG. 7.

In some embodiments, as shown in FIG. 9, the searching module 20 may specifically comprise a prompting unit 201 and a searching unit 202. The prompting unit 201 is configured to extract flight data of at least one flight task from a preset flight database according to the loading request, generate a user prompt according to the extracted flight data, and display the user prompt. The searching unit 202 is configured to receive a select operation event performed on the displayed user prompt, and search for corresponding flight data according to the select operation event.

In some embodiments, the prompting unit 201 may comprise an extracting subunit configured to extract the flight data of the at least one flight task from the preset flight database according to the loading request, a generating subunit configured to generate a flight preview image corresponding to each flight task according to the extracted flight data of each flight task and a preset environmental map, and a displaying subunit configured to display the flight preview image as the user prompt to the user.

In some embodiments, the generating subunit may be specifically configured to generate a three-dimensional flight route image of each flight task in the preset environmental map according to the extracted flight parameters of the flight task, configure the description information of at least one waypoint at the at least one waypoint in the three-dimensional flight route image, and display the three-dimensional flight route image having the description information as the flight preview image. In some embodiments, the description information exhibited at the at least one waypoint may comprise position information of the at least one waypoint and or reference information of an image shot at the position point.

In some embodiments, the generating subunit may be specifically configured to generate a user interface of a three-dimensional flight route of each flight task in the preset environmental map according to the extracted flight parameters of the flight task. The generating subunit may be further configured to, when an edit operation on flight parameters of one or more waypoints on the three-dimensional flight route in the user interface is detected, perform data update for the three-dimensional flight route in the user interface according to the edited flight parameters, and display the updated user interface of the three-dimensional flight route including the flight task as the flight preview image.

The generating subunit may have both of the above-described two preview-image-generating functions. The user can select one of or switch between the functions as needed.

Referring again to FIG. 7, in some embodiments, the device 700 may also comprise a storing module 60 configured to store at least one flight template object including flight instruction data for instructing a flight of an aerial vehicle. The processing module 30 may be further configured to, when receiving a template loading request, search for a flight template object according to the template loading request, process the located flight template object, load the flight template object to control the flight of the aerial vehicle.

In some embodiments, the device 700 may also comprise a sharing module 70 configured to, when receiving a sharing request, searching for and sharing flight data corresponding to a flight task indicated by the sharing request.

Specifically, specific implementations of various modules, units and subunits involved in the embodiments of the present disclosure are similar to the exemplary methods described above with reference to FIG. 2 to FIG. 5.

It should be noted that, a device for processing a flight task, such as one of the exemplary device described above with reference to FIG. 6 to FIG. 9 may be likewise disposed in a server.

A device consistent with the present disclosure can load flight data of various performed and stored flight tasks at any time according to the needs of a user. As such, time and effort may be saved. The device is convenient to use and meets the users requirement to automate and intelligentize the process of reproducing a flight task.

Figure 10:
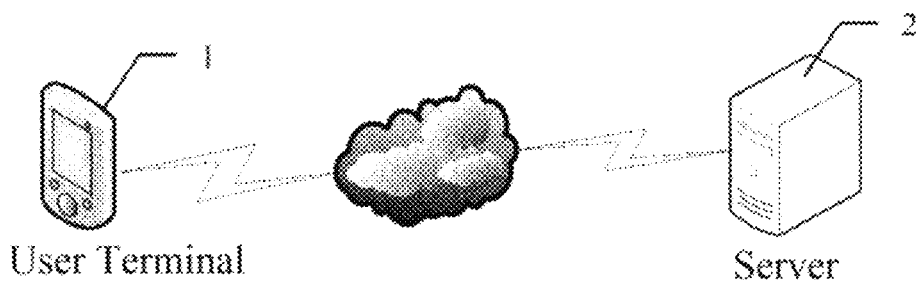
FIG. 10 is a schematic view of a system for processing a flight in accordance with an embodiment of the present disclosure.

FIG. 10 is a schematic view of a system for processing a flight in accordance with an embodiment of the present disclosure. The system in accordance with the embodiment of the present embodiment may comprise at least one user terminal 1 configured to control an aerial vehicle and a server 2. In some embodiments, the user terminal 1 may be configured to initiate a loading request for flight data. The server 2 may be configured to, after receiving the loading request for flight data, search for corresponding flight data in a preset flight database according to the loading request. The flight database records flight data corresponding to at least one flight task. The server 2 may further be configured to, in response to the loading request, process the located flight data, and send the processed flight data to the user terminal 1.

The user terminal 1 may further be configured to generate a flight instruction according to the received flight data to control a flight of the aerial vehicle managed by the user terminal 1.

In some embodiments, the user terminal 1 may also be configured to, when receiving a sharing request for recorded flight data of the flight task, send the recorded flight data of the flight task to the server 2, to share the flight data of the flight task.

The specific implementations of the user terminal 1 and the server 2 are similar to the exemplary methods and devices described above with reference to FIG. 1 to FIG. 9.

Figure 11:
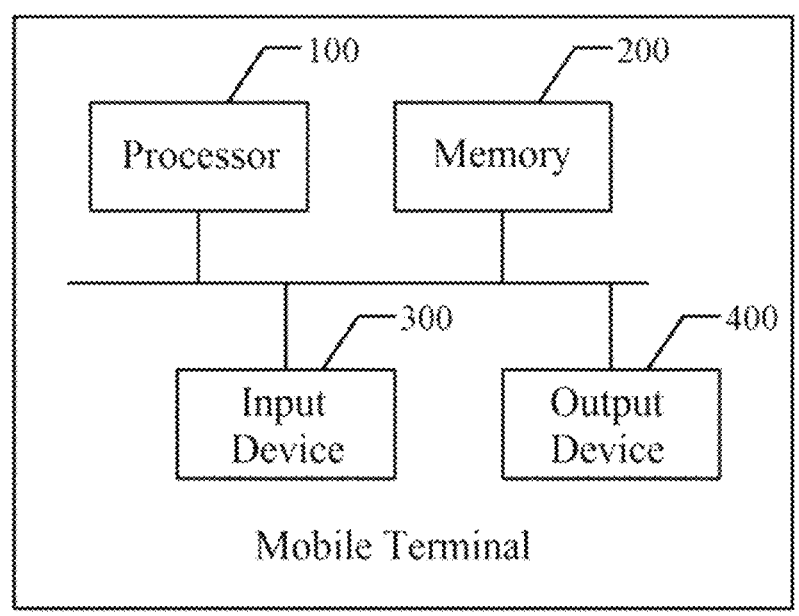
FIG. 11 is a schematic view of a mobile terminal in accordance with an embodiment of the present disclosure.

FIG. 11 is a schematic view of a mobile terminal in accordance with an embodiment of the present disclosure. The mobile terminal in accordance with the embodiment of the present disclosure may comprise a processor 100, a memory 200, an input device 300, and an output device 400. In some embodiments, the memory 200 may store a flight task processing program that may be invoked by the processor 100 to processing of a flight task.

The processor 100 may invoke the flight task processing program stored in the memory 200. When the input device 300 receives a loading request for flight data, the processor 100 searches for corresponding flight data according to the loading request. The processor 100 processes located flight data in response to the loading request, to complete a loading operation for the located flight data so as to control a corresponding aerial vehicle to perform a corresponding flight task.

In some embodiments, the processor 100 may be specifically configured to search for the corresponding flight data in a preset flight database according to the loading request. The flight database records flight data corresponding to at least one flight task.

In some embodiments, the processor 100 may also be configured to obtain flight data corresponding to various flight tasks and update the preset flight database according to the obtained flight data of the various flight tasks.

In some embodiments, the processor 100, when configured to obtain the flight data corresponding to the flight task, may be specifically configured to obtain flight parameters generated by an aerial vehicle in the course of a flight task and generate description information of the flight task according to the obtained flight parameters. The obtained flight parameters and the generated description information are used as the flight data corresponding to the flight task.

In some embodiments, the processor 100, when configured to obtain the flight parameters generated by the aerial vehicle in the course of the flight task, may be specifically configured to obtain flight parameters of at least one managed aerial vehicle in the course of the at least one aerial vehicle performing a flight task and/or download from a server flight parameters generated by the aerial vehicle in the course of performing the flight task and uploaded onto the server.

In some embodiments, the flight parameters may comprise any one or a combination of more than one of a waypoint coordinate, an altitude of a waypoint, a flight speed of a corresponding aerial vehicle in the course of flight, and an image acquiring direction and an image acquiring speed of an image acquiring device mounted on the aerial vehicle. The description information may comprise description information of a flight region determined according to a waypoint coordinate in the flight parameters.

In some embodiments, the processor 100, when configured to search for the corresponding flight data in the preset flight database according to the loading request, may be specifically configured to extract flight data of at least one flight task from the preset flight database according to the loading request, generate a user prompt according to the extracted flight data, and display the user prompt. The processor 100 may be further configured to receive a select operation event performed on the displayed user prompt and search for the corresponding flight data according to the select operation event.

In some embodiments, the processor 100, when configured to extract the flight data of the at least one flight task from the preset flight database according to the loading request, generate the user prompt according to the extracted flight data, and display the user prompt, may be specifically configured to extract the flight data of the at least one flight task from the database, generate a flight preview image corresponding to each flight task according to the extracted flight data of each flight task and a preset environmental map, and display the flight preview image as the user prompt to the user.

In some embodiments, the processor 100, when configured to generate the flight preview image corresponding to each flight task according to the extracted flight data of each flight task and the preset environmental map, may be specifically configured to generate a three-dimensional flight route image of each flight task in the preset environmental map according to the extracted flight parameters of the flight task, configure the description information of at least one waypoint at the at least one waypoint in the three-dimensional flight route image, and display the three-dimensional flight route image having the description information as the flight preview image. In some embodiments, the description information exhibited at the at least one waypoint may comprise position information of the at least one waypoint and/or reference information of an image shot at the position point.

In some embodiments, the processor 100, when configured to generate the flight preview image corresponding to each flight task according to the extracted flight data of each flight task and the preset environmental map, may be specifically configured to generate a user interface of a three-dimensional flight route of each flight task in the preset environmental map according to the extracted flight parameters of the flight task, detect an edit operation for flight parameters of one or more waypoints on the three-dimensional flight route in the user interface, perform data update for the three-dimensional flight route in the user interface according to edited flight parameters, display the updated user interface of the three-dimensional flight route including the flight task as the flight preview image.

In some embodiments, the processor 100 may also be specifically configured to store at least one flight template object including flight instruction data for instructing a flight of an aerial vehicle. The processor 100 may be further configured to, when receiving a template loading request, search for a flight template object according to the template loading request, and process a located flight template object to complete a loading operation of the flight template object so as to control the flight of the aerial vehicle.

In some embodiments, the processor 100 may also be specifically configured to, when receiving a sharing request, search for the flight data corresponding to the flight task indicated by the sharing request, and share the flight data through the output device 400.

The specific implementations of the processor 100 are similar to the exemplary methods described above with reference to FIG. 1 to FIG. 5.

A terminal consistent with the present disclosure can load flight data of various performed and stored flight tasks at any time according to the needs of a user. As such, time and effort may be saved. The terminal is convenient to use and meets the user's requirement to automate and intelligentize the process of reproducing a flight task.

In the several embodiments provided by the present disclosure, it should be understood that, the disclosed related device and method may be implemented by other manners. For example, the above described device embodiments are merely schematic. For example, the division of the modules or units is merely a logic function division, and other division manners may be employed during actual practice. For example, more units or components may be combined or may be integrated into another system. Further, some features may be omitted or not be performed. Additionally, couplings or direct couplings or communication connections between one and another as displayed or discussed may be indirect couplings or communication connections via some interfaces, devices or units, or may be in electric, mechanical or other forms.

Units described as separate parts may or may not be separated physically. Components displayed as units may or may not be physical units, i.e., they may be located in one place, or may be distributed onto a plurality of network units. Some or all of the units may be selected in order to achieve the objects of the solutions of embodiments according to the actual requirements.

Additionally, various functional units in various embodiments according to the present disclosure may be integrated into one processing unit, or may be physically individual. Two or more of various function units may be integrated into one unit. The above integrated unit may be implemented in a form of hardware or in a form of functional units of software.

The integrated units if being implemented in a form of functional units of software and being independent products for sale and use may be stored in a computer-readable storage medium. Based on such understandings, part or all of the technical solution of the present disclosure may be embodied in a form of a software product. The software product may be stored in a storage medium, and comprise several instructions for causing a computer processor to execute part or all a method consistent with the present disclosure, such as one of the above-described exemplary methods. The above-mentioned storage medium may comprise a medium capable of storing program codes, such as a USB flash disk, a movable hard disc, a Read-Only Memory (ROM), a random access memory (RAM), a diskette or an optical disc.

The foregoing disclosure is merely illustrative of the embodiments of the disclosure, and is not intended to limit the scope of the disclosure. Any equivalent structural or flow variations made on the basis of the description and the drawings of the disclosure, and their direct or indirect application to other relevant technical fields, shall all fall into the scope of the disclosure.

What is claimed is:

1. A flight task processing method comprising:
    obtaining flight data corresponding to a past flight task, including performing at least one of:
        obtaining flight data of a managed aerial vehicle generated while performing the past flight task; or
        downloading, from a server, flight data corresponding to the past flight task that is generated by the aerial vehicle while performing the past flight task and uploaded onto the server;
    updating a preset flight database according to the flight data corresponding to the past flight task;
    receiving a flight data loading request;
    searching for corresponding flight data according to the loading request, the flight data being collected by the aerial vehicle during a course of the past flight task performed by the aerial vehicle at a past time;
    processing located flight data in response to the loading request to obtain control instruction, the located flight data including a waypoint coordinate of at least one waypoint, an orientation of a gimbal at the at least one waypoint, and an image acquired by a camera carried on the gimbal at the at least one waypoint associated with the past flight task; and
    automatically controlling, according to the control instruction, an operation of a corresponding aerial vehicle to reproduce the past flight task, wherein reproducing the past flight task includes:
        controlling the corresponding aerial vehicle to fly to the at least one waypoint;
        controlling a gimbal of the corresponding aerial vehicle to face the orientation while the corresponding aerial vehicle is at the at least one waypoint; and
        controlling a camera carried on the gimbal of the corresponding aerial vehicle to acquire an image while the corresponding aerial vehicle is at the at least one waypoint.

2. The method of claim 1, wherein searching for the corresponding flight data comprises:
    searching for the corresponding flight data in the preset flight database according to the loading request.

3. The method of claim 1, wherein the flight data corresponding to the past flight task is generated through a manual operation of the aerial vehicle to perform the past flight task.

4. The method of claim 2, wherein searching for the corresponding flight data in the preset flight database comprises:
    extracting flight data of at least one saved flight task from the preset flight database according to the loading request;
    generating a user prompt according to the extracted flight data;
    displaying the user prompt;
    receiving a select operation performed on the user prompt; and
    searching for the corresponding flight data according to the select operation.

5. The method of claim 4, wherein:
    generating the user prompt comprises generating a flight preview image corresponding to each of the at least one saved flight task according to the extracted flight data of the at least one saved flight task and a preset environmental map; and
    displaying the user prompt comprises displaying the flight preview image as the user prompt.

6. The method of claim 5, wherein:
    generating the flight preview image comprises:
        generating a three-dimensional flight route image of each of the at least one saved flight task in the preset environmental map according to the extracted flight parameters of the at least one saved flight task, the three-dimensional flight route image including the at least one waypoint; and
        configuring the description information of the at least one waypoint in the three-dimensional flight route image; and
    displaying the flight preview image comprises displaying the three-dimensional flight route image having the description information as the flight preview image.

7. The method of claim 5, wherein:
    generating the flight preview image comprises:
        generating a user interface of a three-dimensional flight route of each of the at least one saved flight task in the preset environmental map according to the extracted flight parameters of the at least one saved flight task, the three-dimensional flight route including the at least one waypoint; and
        performing, when an edit operation on flight parameters of the at least one waypoint on the three-dimensional flight route in the user interface is detected, data update for the three-dimensional flight route in the user interface according to edited flight parameters; and
    displaying the flight preview image comprises displaying an updated user interface of the three-dimensional flight route as the flight preview image.

8. The method of claim 1, further comprising:
    searching, when a sharing request is received, for flight data corresponding to a flight task indicated by the sharing request; and
    sharing the flight data corresponding to the flight task indicated by the sharing request.

9. The method of claim 1, further comprising:
    displaying a three-dimensional flight route image according to the flight data loading request; and
    receiving an operation performed on the three-dimensional flight route image;

wherein searching for the corresponding flight data includes searching for the corresponding flight data according to the loading request and the received operation.

10. The method of claim 9, further comprising:
displaying, at the at least one waypoint in the three-dimensional flight route image, the image acquired at the at least one waypoint and reference information of the image acquired at the at least one waypoint;
wherein automatically controlling the operation of the corresponding aerial vehicle to reproduce the past flight task includes:
automatically controlling, according to the control instruction and the three-dimensional flight route image, the operation of the corresponding aerial vehicle to reproduce the past flight task.

11. A flight task processing device comprising:
a processor;
an input device coupled to the processor and configured to receive a flight data loading request; and
a memory coupled to the processor and storing instructions that, when executed by the processor, cause the processor to:
obtain flight data corresponding to a past flight task, including performing at least one of:
obtaining flight data of a managed aerial vehicle generated while performing the past flight task; or
downloading, from a server, flight data corresponding to the past flight task that is generated by the aerial vehicle while performing the past flight task and uploaded onto the server;
update a preset flight database according to the flight data corresponding to the past flight task;
search for corresponding flight data according to the loading request, the flight data being collected by the aerial vehicle during a course of the past flight task performed by the aerial vehicle at a past time;
process, in response to the loading request, located flight data to obtain control instruction, the located flight data including a flight route that includes a waypoint coordinate of at least one waypoint, an orientation of a gimbal at the at least one waypoint, and an image acquired by a camera carried on the gimbal at the at least one waypoint associated with the past flight task; and
automatically control, according to the control instruction, an operation of a corresponding aerial vehicle to reproduce the past flight task, wherein reproducing the past flight task includes:
controlling the corresponding aerial vehicle to fly to the at least one waypoint;
controlling a gimbal of the corresponding aerial vehicle to face the orientation while the corresponding aerial vehicle is at the at least one waypoint; and
controlling a camera carried on the gimbal of the corresponding aerial vehicle to acquire an image while the corresponding aerial vehicle is at the at least one waypoint.

12. The device of claim 11, wherein the instructions further cause the processor to search for the corresponding flight data in the preset flight database according to the loading request.

13. The device of claim 11, wherein the flight data corresponding to the past flight task is generated through a manual operation of the aerial vehicle to perform the past flight task.

14. The device of claim 12, wherein the instructions further cause the processor to:
extract flight data of at least one saved flight task from the preset flight database according to the loading request;
generate a user prompt according to extracted flight data;
display the user prompt;
receive a select operation performed on the user prompt; and
search for the corresponding flight data according to the select operation.

15. The device of claim 14, wherein the instructions further cause the processor to:
extract the flight data of the at least one saved flight task from the preset flight database according to the loading request;
generate a flight preview image corresponding to each of the at least one saved flight task according to the extracted flight data of the at least one saved flight task and a preset environmental map; and
display the flight preview image as the user prompt.

16. The device of claim 14, wherein the instructions further cause the processor to:
generate a three-dimensional flight route image of each of the at least one flight task in the preset environmental map according to the extracted flight parameters of the at least one saved flight task, the three-dimensional flight route image including the at least one waypoint;
configure description information of the at least one waypoint in the three-dimensional flight route image; and
display the three-dimensional flight route image having the description information of the at least one waypoint as the flight preview image.

17. The device of claim 14, wherein the instructions further cause the processor to:
generate a user interface of a three-dimensional flight route of each of the at least one saved flight task in the preset environmental map according to the extracted flight parameters of the at least one saved flight task, the three-dimensional flight route including the at least one waypoint;
perform, when receiving an edit operation on flight parameters of the at least one waypoint on the three-dimensional flight route in the user interface, data update for the three-dimensional flight route in the user interface according to edited flight parameters; and
display an updated user interface of the three-dimensional flight route as the flight preview image.

18. A flight processing system comprising:
a user terminal configured to initiate a flight data loading request; and
a server configured to, after receiving the loading request:
search for corresponding flight data in a preset flight database according to the loading request, the flight data being collected by an aerial vehicle during a course of a past flight task performed by the aerial vehicle at a past time;
process, in response to the loading request, located flight data including a waypoint coordinate of at least one waypoint, an orientation of a gimbal at the at least one waypoint, and an image acquired by a camera carried on the gimbal at the at least one waypoint associated with the past flight task; and
send processed flight data to the user terminal;
wherein the user terminal is further configured to:
obtain the flight data corresponding to the past flight task, including performing at least one of:

obtaining flight data of a managed aerial vehicle generated while performing the past flight task; or downloading, from the server, flight data corresponding to the past flight task that is generated by the aerial vehicle while performing the past flight task and uploaded onto the server;

update the preset flight database according to the flight data corresponding to the past flight task;

generate a flight instruction according to the processed flight data to control an operation of a corresponding aerial vehicle managed by the user terminal to reproduce the past flight task according to the processed flight data, wherein reproducing the past flight task includes:

controlling the corresponding aerial vehicle to fly to the at least one waypoint;

controlling a gimbal of the corresponding aerial vehicle to face the orientation while the corresponding aerial vehicle is at the at least one waypoint; and controlling a camera carried on the gimbal of the corresponding aerial vehicle to acquire an image while the corresponding aerial vehicle is at the at least one waypoint.

\* \* \* \* \*